2,984,274
Patented May 16, 1961

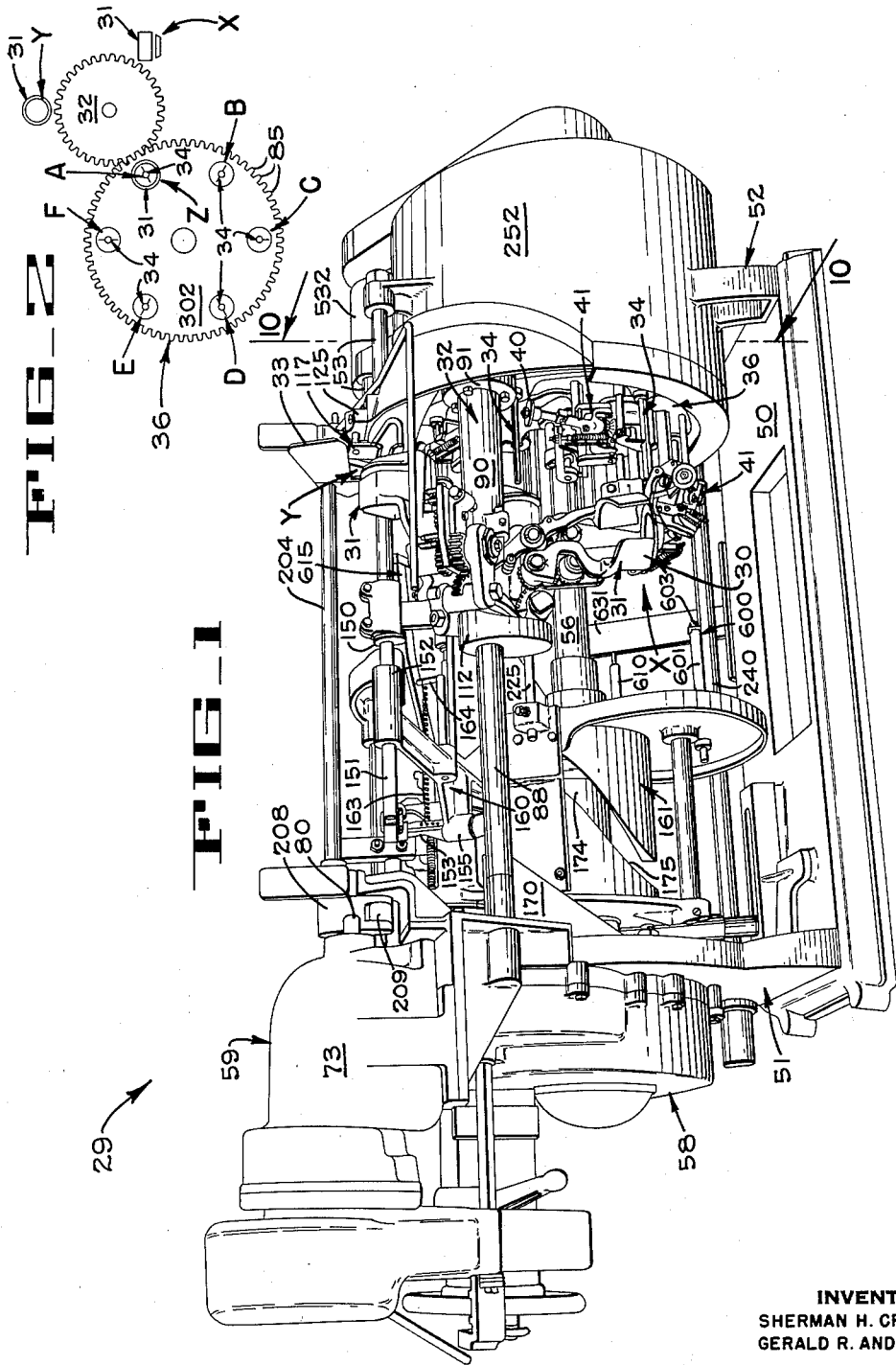

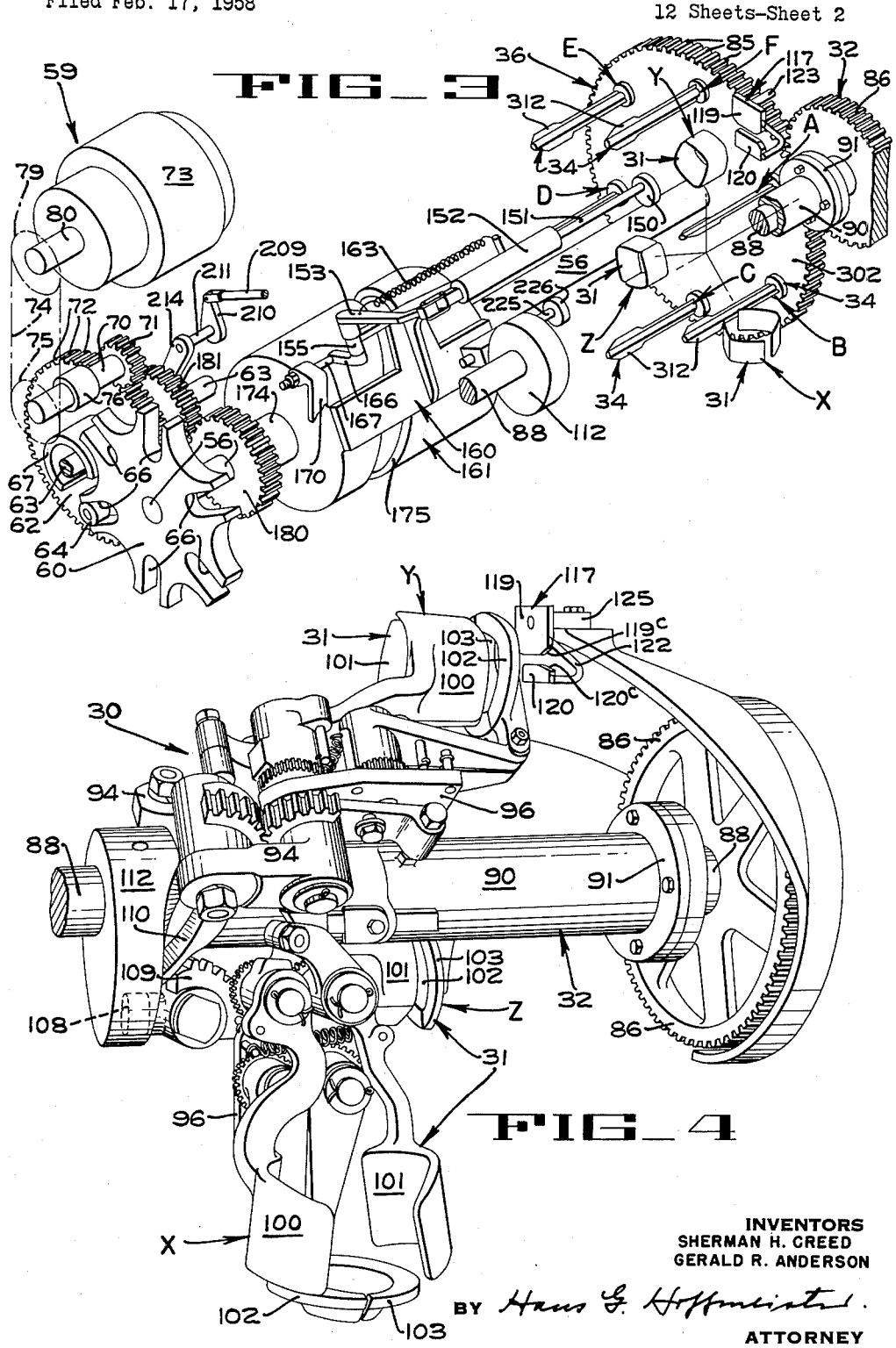

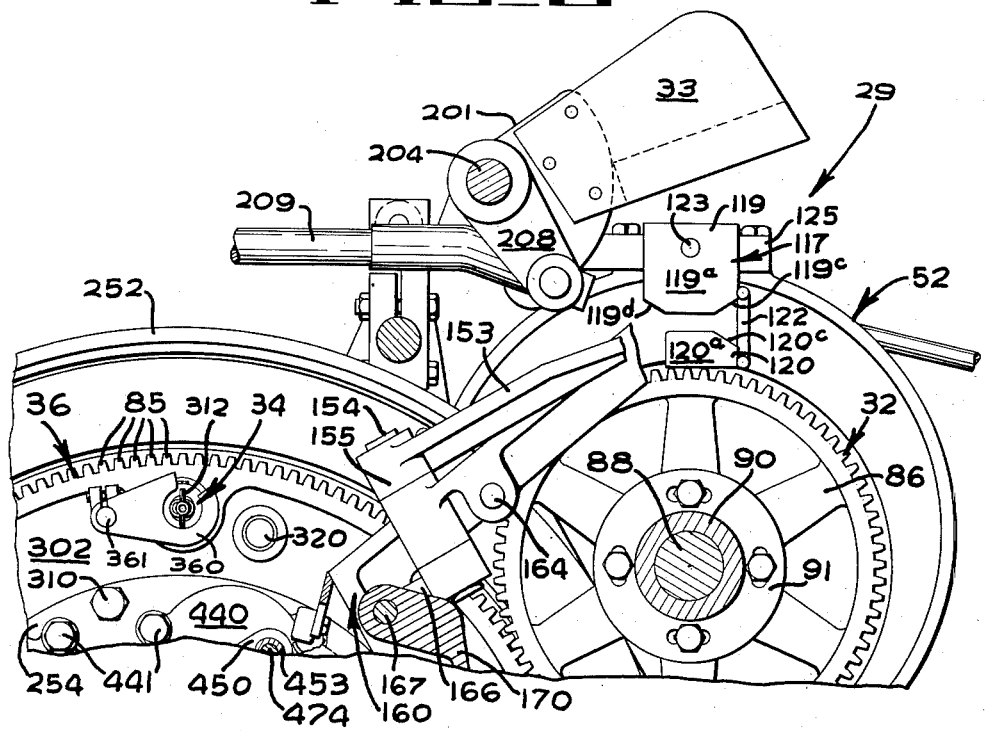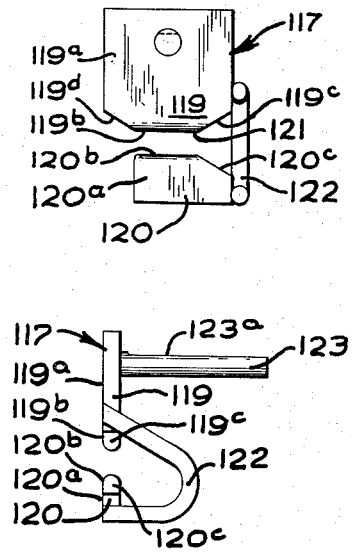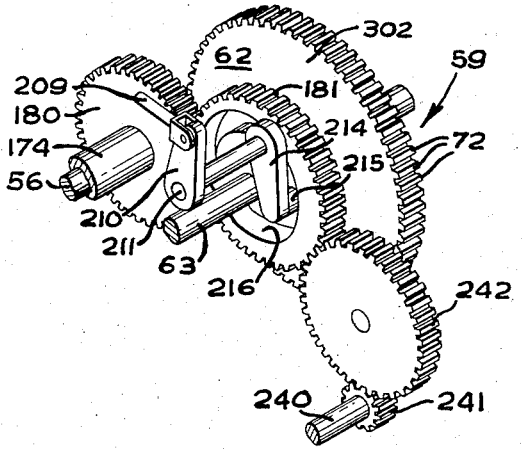

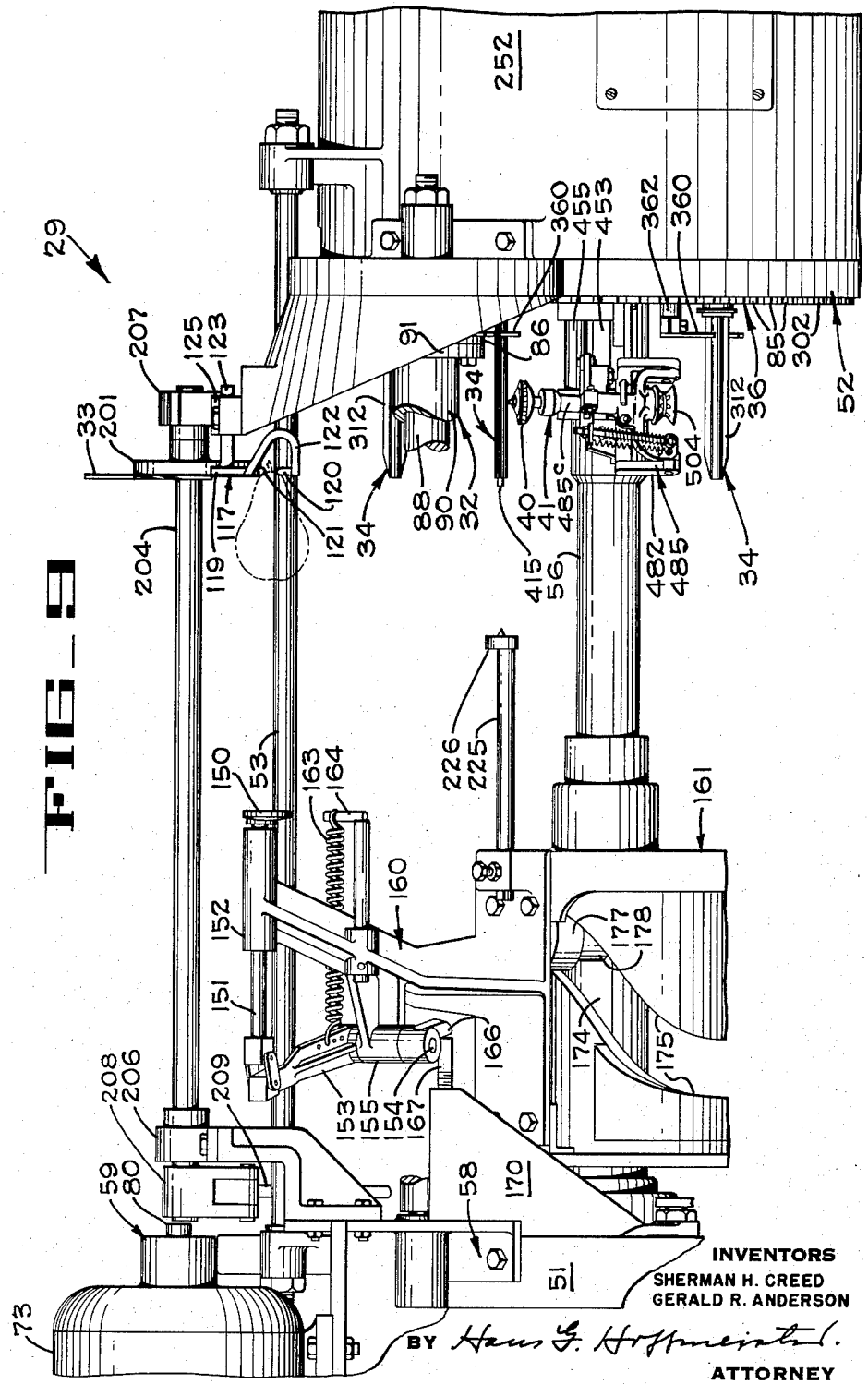

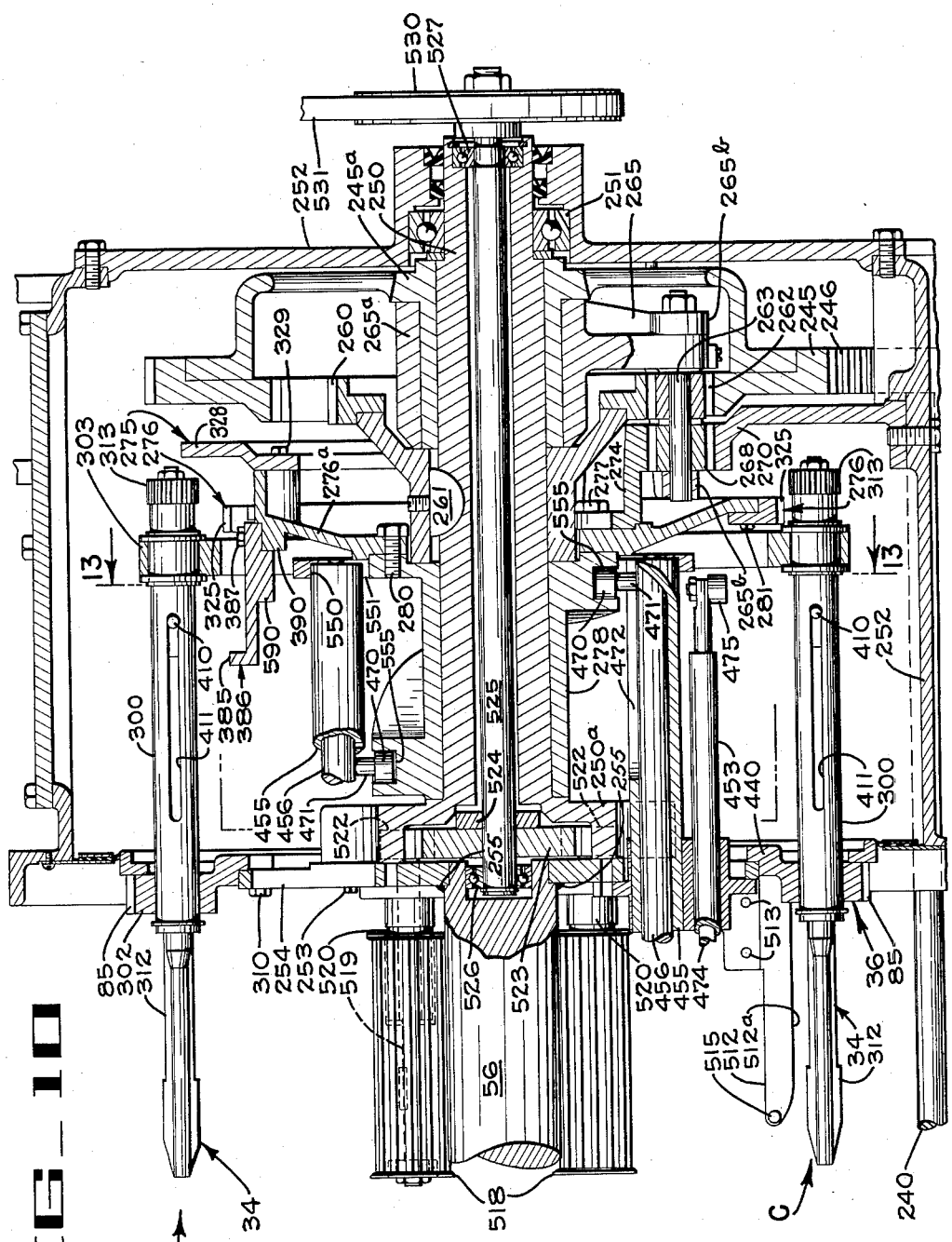

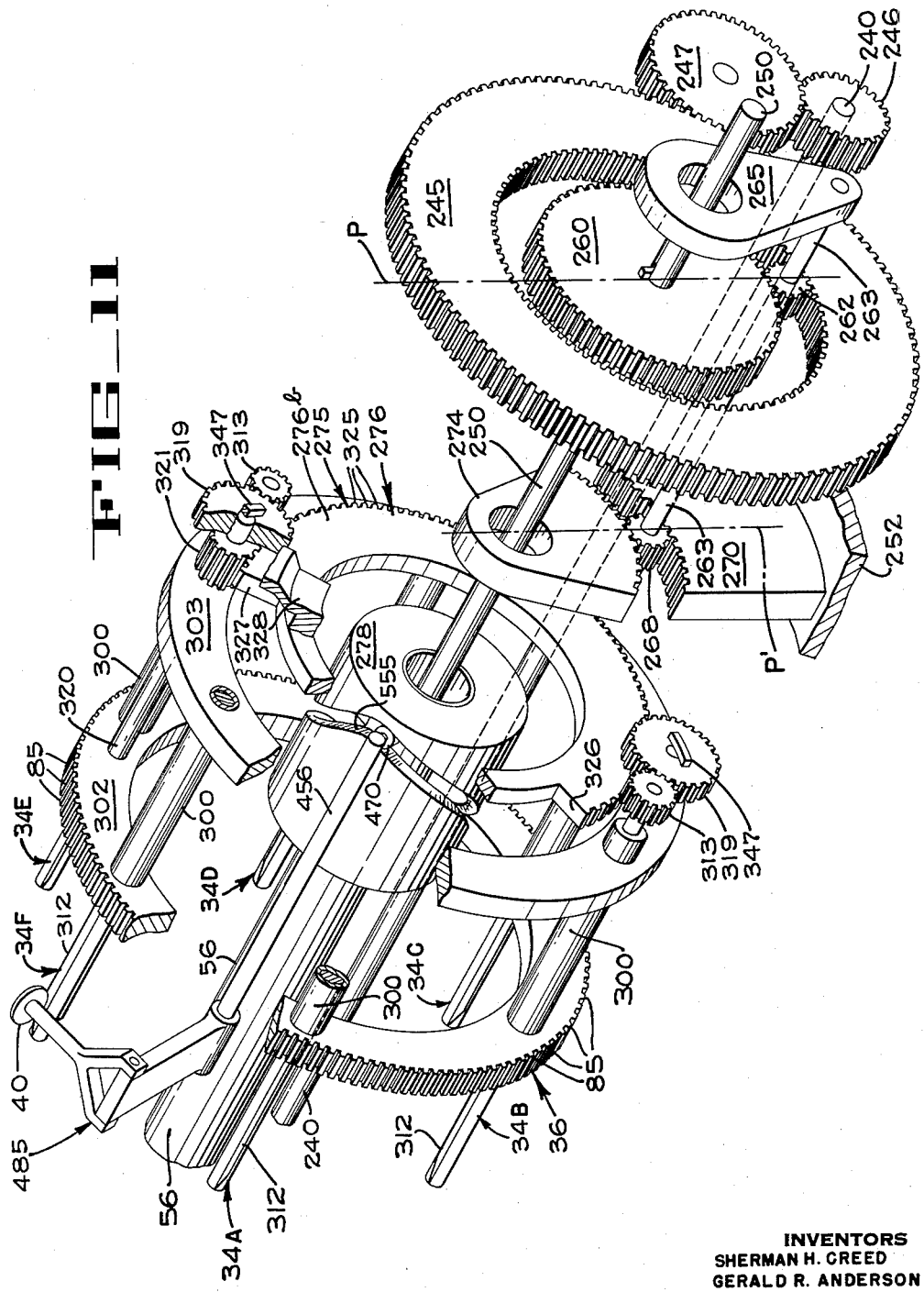

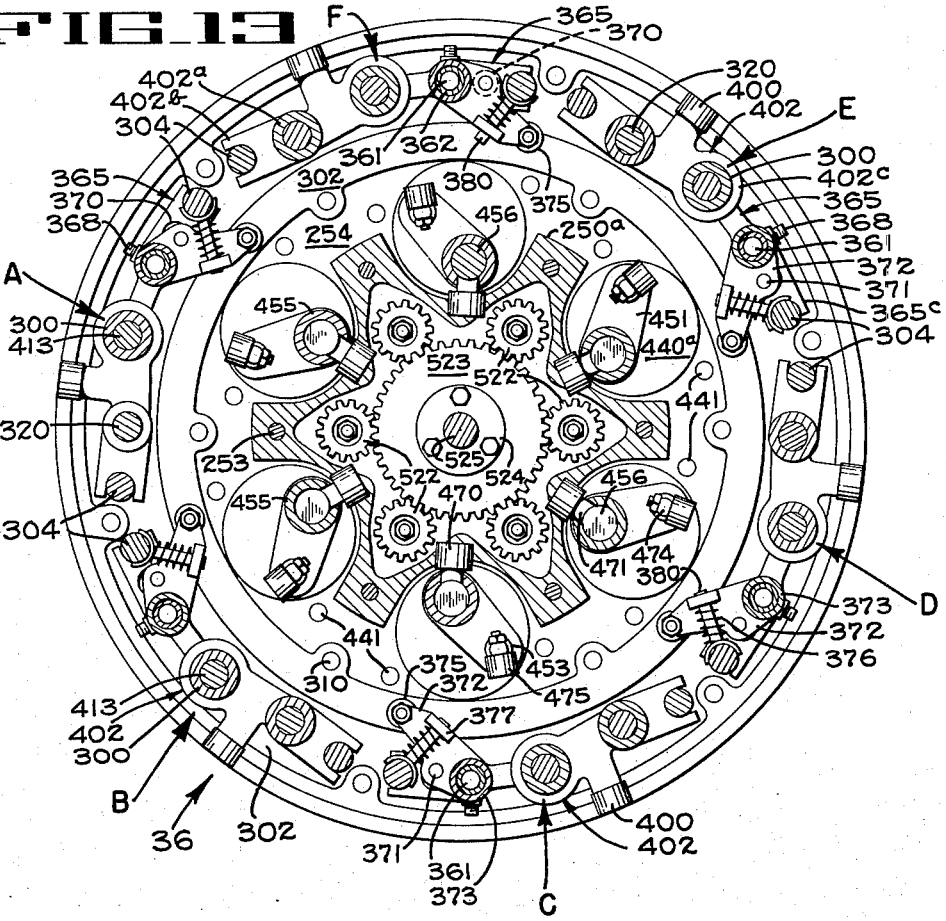
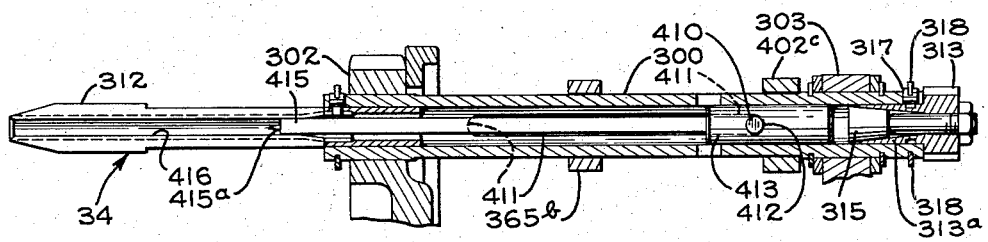

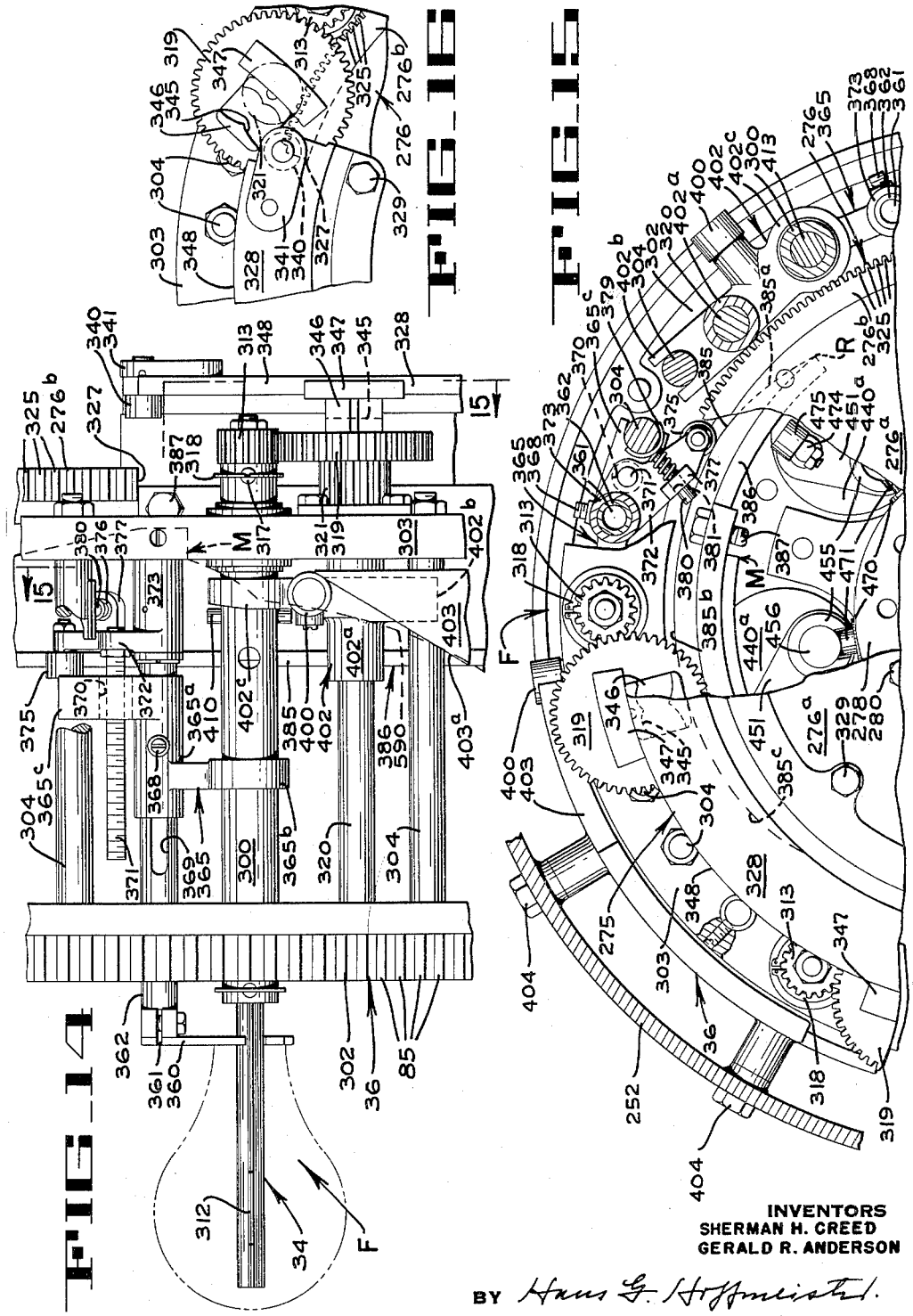

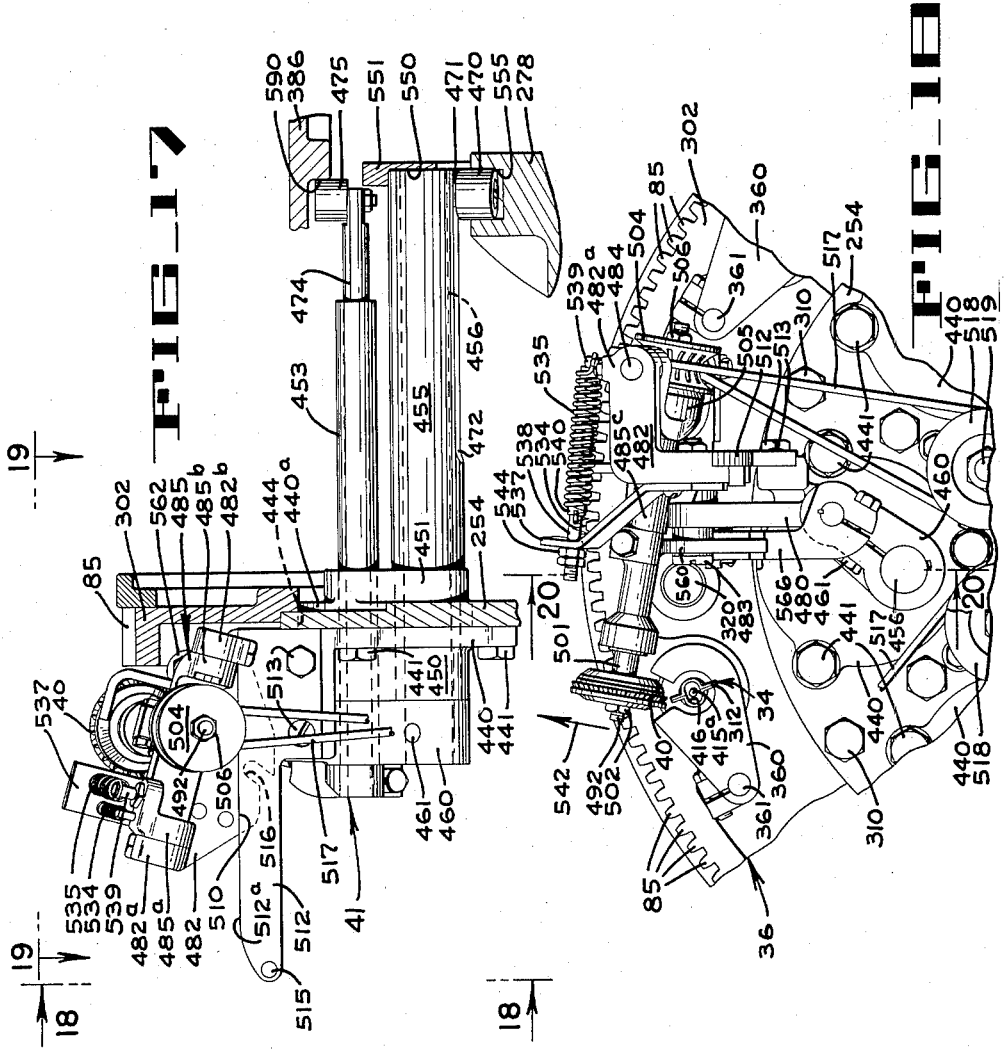

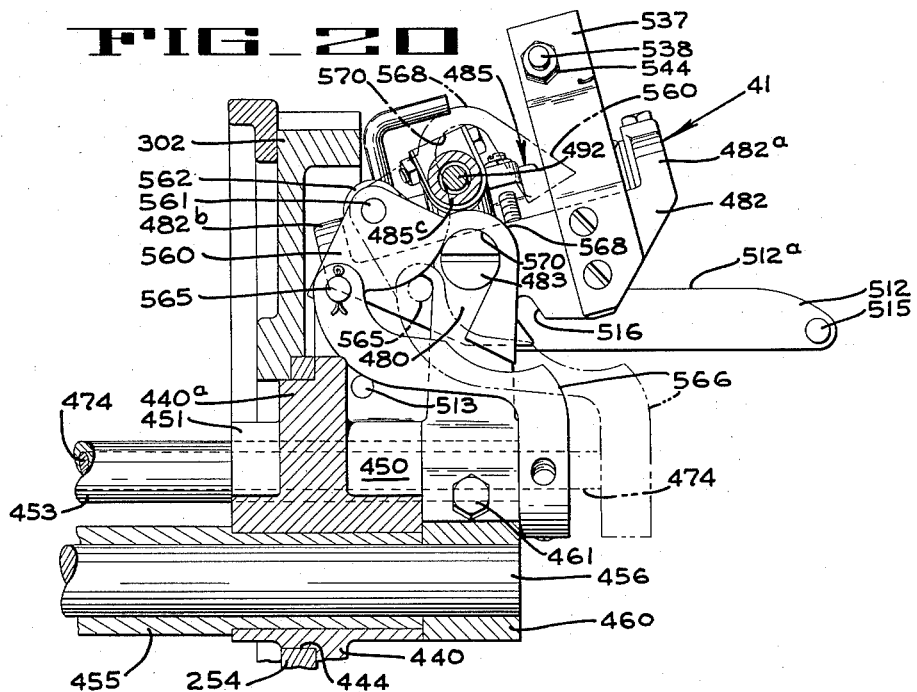
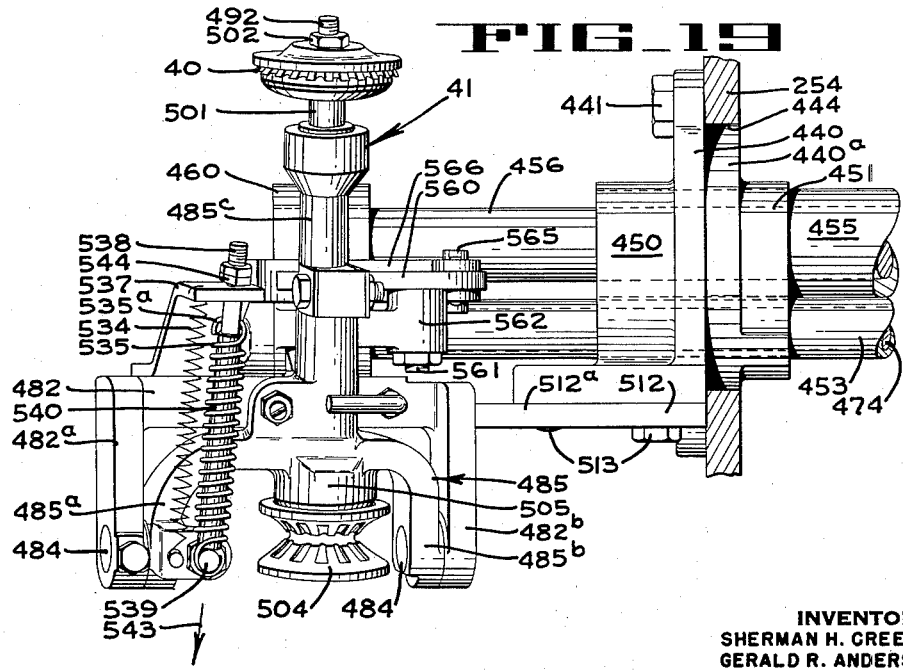

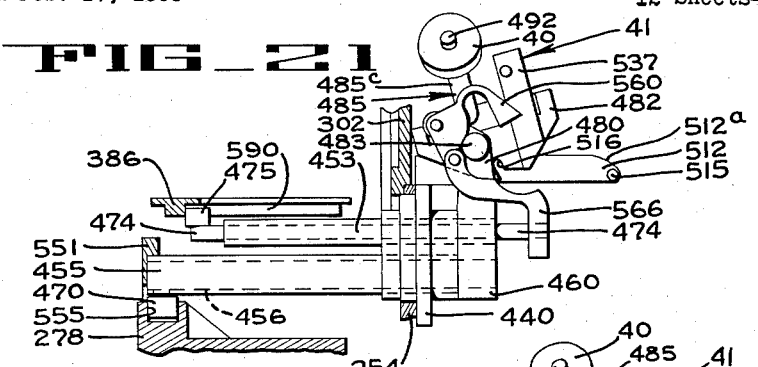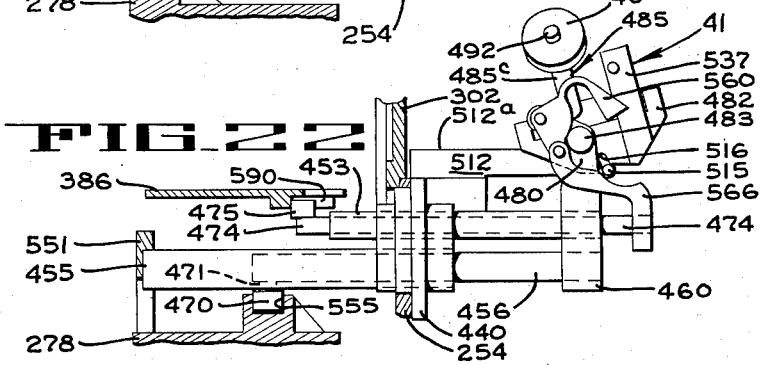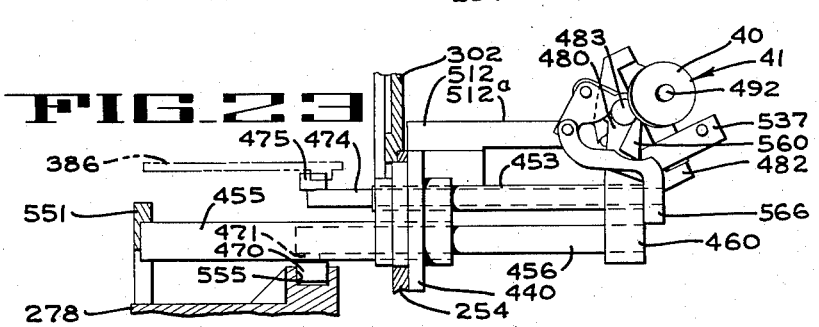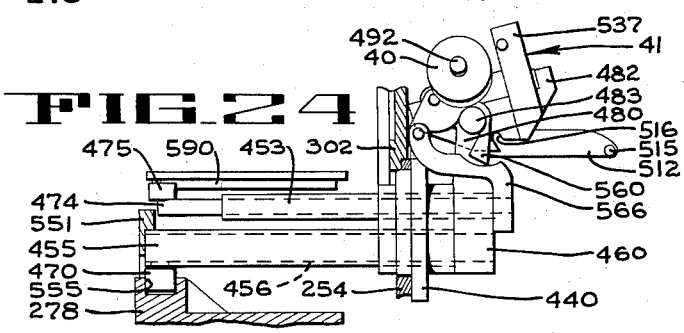

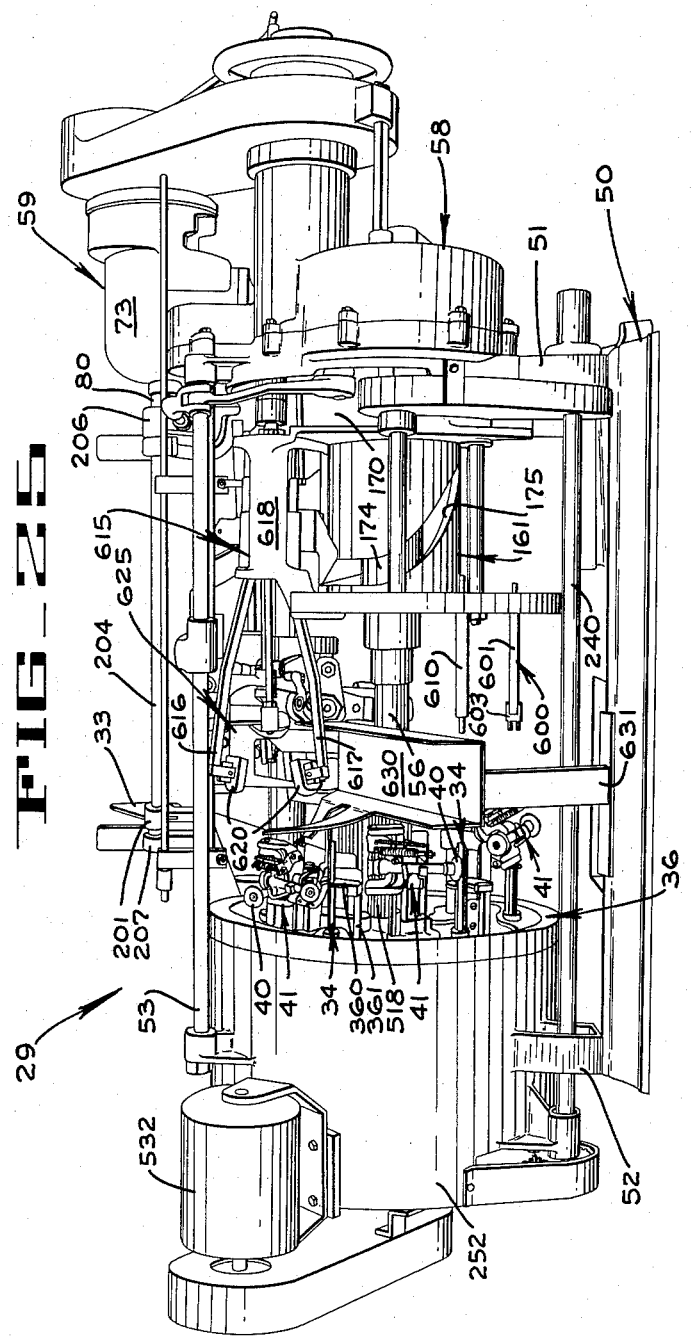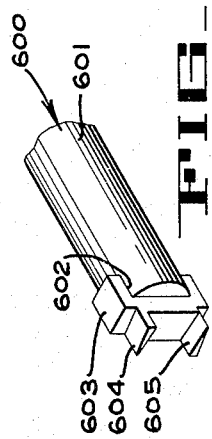
INVENTORS
SHERMAN H. CREED
GERALD R. ANDERSON

2,984,274
PEAR PEELING MACHINE

Sherman H. Creed, San Jose, and Gerald R. Anderson, Campbell, Calif., assignors to Food Machinery and Chemical Corporation, San Jose, Calif., a corporation of Delaware Filed Feb. 17, 1958, Ser. No. 715,805

31 Claims. (Cl. 146—43)

This invention pertains to a fruit handling machine, and more particularly relates to a machine for preparing pears or the like for canning.

An object of the present invention is to provide an improved machine for peeling, halving, coring and trimming pears.

Another object is to provide an improved drive mechanism for a fruit processing machine.

Another object is to provide an improved mechanism for gauging and trimming the stem end of a pear.

Another object is to provide an improved drive mechanism for a peeling knife.

Another object is to provide an efficient mechanism for controlling the movements of a rotary peeling unit in a fruit processing machine.

Another object is to provide an improved stemming mechanism.

Another object is to provide in a fruit preparation machine an improved drive mechanism for rotary stemming tubes.

Another object is to provide a novel stem ejector mechanism.

Another object is to provide an improved mechanism for preventing endwise movement of a pear during peeling and means for locking said mechanism during peeling.

Another object is to provide an efficient rotary peeling unit.

Another object is to provide a novel butt end trimming mechanism.

Other and further objects and advantages of the present invention will become apparent from the following detailed description taken in connection with the accompanying drawings in which:

Fig. 1 is a perspective of the fruit preparation machine of the present invention, particularly showing the feed side of the machine.

Fig. 2 is a schematic showing of a portion of the drive mechanism of the machine of Fig. 1.

Fig. 3 is a diagrammatic view showing the main drive mechanism of the machine of Fig. 1.

Fig. 4 is a perspective of the fruit feeding mechanism used in the machine of Fig. 1.

Fig. 5 is a fragmentary end elevation, with parts broken away, of the machine particularly showing the stem end cut-off knife.

Fig. 6 is a front elevation of the stem end gauge plate used in cooperation with the cut-off knife of Fig. 5, said gauge plate being shown disconnected from the machine.

Fig. 7 is a side elevation of the gauge plate of Fig. 6.

Fig. 8 is a diagrammatic perspective of a portion of the drive mechanism of the machine.

Fig. 9 is a fragmentary side elevation, with parts broken away, of the machine.

Fig. 10 is a vertical section, with parts broken away, taken centrally through the stemming tube turret at one end of the machine, as indicated by line 10—10 of Fig. 1.

Fig. 11 is a diagrammatic perspective showing an auxiliary drive mechanism disposed in the stemming tube turret of Fig. 10.

Fig. 12 is a longitudinal section taken centrally through one of the stemming tube units mounted in the stemming tube turret of Fig. 10.

Fig. 13 is a vertical section taken on line 13—13 of Fig. 10.

Fig. 14 is a plan view of a portion of the stemming tube turret of the present machine, with the housing of the turret removed.

Fig. 15 is a vertical section with parts broken away taken on line 15—15 of Fig. 14.

Fig. 16 is a fragmentary elevation of a portion of the mechanism of Fig. 15, particularly showing a stemming tube locking mechanism.

Fig. 17 is a side elevation of one of the rotary peeling units of the present machine, said unit being shown mounted on one end of the stemming tube turret, which is shown in section.

Fig. 18 is an end elevation of the rotary peeling unit of Fig. 17, the view having been taken looking in the direction of arrows 18—18 in Fig. 17.

Fig. 19 is a plan of the peeling unit of Fig. 17, the view having been taken looking in the direction of arrows 19—19 of Fig. 17.

Fig. 20 is a vertical section taken on line 20—20 of Fig. 18.

Figs. 21, 22, 23 and 24 are diagrammatic side elevations showing consecutive operating positions of one of the peeling units used in the present machine.

Fig. 25 is a rear elevation of the machine of the present invention.

Fig. 26 is an enlarged fragmentary perspective of a butt end trimming mechanism used in the present machine.

The pear processing machine 29 (Fig. 1) of the present invention comprises a feed mechanism 30 having three feed cup assemblies 31 (Fig. 2) each of which is mounted on a feed turret 32 and is arranged to receive a pear stem-end-down at a feed station X, move the pear to station Y where a bobbing knife 33 (Fig. 1) cuts off the stem end of the pear. The pear is then moved to station Z where it is transferred from the feed cup to one of a plurality of stemming tubes 34 which are mounted for rotation on a stemming tube turret 36. The turret 36 is intermittently indexed in a clockwise direction (Fig. 2) to carry the stemming tube to consecutive stations A, B, C, D, E, and F. While the pear is being carried around on the tube turret 36, the tube 34 is rotated about its own axis and a rotary cutter 40 (Fig. 1) of a peeling unit 41 is moved along the surface of the pear in a direction axially of the stemming tube from the butt end to the stem end of the pear. When the pear has been peeled, the rotation of the stemming tube is stopped, the rotary cutter 40 is moved away from the pear, and the pear is then removed from the stemming tube at station F (Fig. 2).

The machine 29 includes a rigid base 50 (Fig. 1) upon which is mounted a pair of end standards 51 and 52 rigidly interconnected by suitable longitudinal tie rods 53. A turret drive shaft 56 extends between the end standards and is journalled for rotation in bearing members (not shown) in these standards.

The turret drive shaft 56 is driven from a drive mechanism 59 disposed at the end of the machine supported by end standard 51. The shaft 56 projects beyond the end standard 51 into a gear housing 58 and is arranged to be intermittently rotated in one-sixth of a revolution increments by means of a Geneva gear 60 (Fig. 3) disposed in the gear housing and keyed to the shaft 56. The Geneva gear 60 is actuated by a driver gear 62 keyed to a shaft 63 and carrying the usual driver roller 64 which operates in radial slots 66 for rotating the Geneva gear 60. When the driver roller 64 is out of engagement with the Geneva gear 60, the gear 60 is locked against rotation by a locking ring 67 carried by the driver 62. The Geneva movement is driven from a continuously rotating drive shaft 70 by means of a pinion gear 71 which is secured to the shaft 70 and disposed in mesh with gear teeth 72 formed on the periphery of the Geneva driver 62. Power for operating the main drive shaft 70 is supplied from an electric motor 73 by means of a chain 74 trained around a sprocket 75 that is keyed to the driven shaft of a clutch 76 disposed on shaft 70, and around a sprocket 79 keyed to the drive shaft 80 of the motor 73. In summary, when the machine is in operation, the drive gear shaft 63 is continuously rotated and the turret shaft 56 is intermittently indexed in 60 degree increments of rotation.

The stemming tube turret 36, which is diagrammatically shown in Figure 3, will be described in detail hereinafter. In general, this turret is connected to the turret shaft 56 and has gear teeth 85 formed on its periphery. The teeth 85 mesh with the teeth of a gear 86 rotatably mounted on a stationary shaft 88 that has its end portions held in fixed position in the end standards 51 and 52. Accordingly, when the turret shaft 56 is intermittently indexed in 60 degree clockwise increments to carry the stemming tubes 34 through stations A to F, the gear 86 is rotated counterclockwise in 120 degree increments.

The pear feed mechanism 30 used in the machine 29 is identical to the feed mechanism disclosed in the copending application of Freeman et al., Serial No. 450,162, now Patent No. 2,905,216, which has been assigned to the assignee of the present application. Said copending application may be referred to for a detailed description of the construction and operation of this unit. In general the feed mechanism 30 comprises a turret 32 (Fig. 4) in the form of a sleeve shaft 90 which is journaled on the stationary shaft 88 and is connected to the hub of gear 86 by a coupling 91. The sleeve shaft 90 has three integrally formed flanges 94 (two only being shown in Fig. 4) which are disposed equi-distantly around the shaft 90 and project radially outwardly therefrom. A feed cup assembly 31 is mounted on each flange 94, each assembly comprising a mounting plate 96 on which two upper jaws 100 and 101, and two lower jaws 102 and 103 are pivotally mounted. The upper jaws are spring-urged toward each other and cooperate to provide a generally cylindrical pocket which is directly above and in alignment with a frusto-conical pocket formed by the two lower jaws 102 and 103, which are also spring-urged toward each other. These two aligned pockets provide a centering chamber for a pear dropped stem-end-down into the pockets.

Each feed cup assembly is pivoted from a position at station X, wherein the axis of the centering chamber is substantially vertical, to a position at station Y, wherein the axis is generally horizontal, by means of a roller follower 108 which is carried by a gear segment 109 of the assembly and is disposed in a twisting cam track 110 formed in an oval shaped cam 112 that is keyed to the stationary shaft 88. The cam track is so designed that, when the sleeve shaft 90 is indexed 120 degrees, the feed cup assembly is swung from a position at right angles to the sleeve shaft 90 to a position generally parallel to the shaft, with the axis of the cup in alignment with a centering gauge 117. The gauge 117 is formed of two members 119 and 120 (Fig. 5) having their forward flat fruit-contact faces 119a and 120a, respectively, in a common vertical plane. A curved strap 122 secures the two members together in spaced relation so that their rounded, confronting edges 119b and 120b define a slot 121 (Fig. 6). These rounded edges tend to center a pear as the stem end is brought into engagement with the edges. A rearwardly projecting mounting rod 123 is welded to the member 119 and has a flattened edge portion 123a disposed in a mating socket (not shown) provided in a bracket 125 (Fig. 5) supported from the end standard 52. The gauge members 119 and 120 have beveled edges 119c and 120c, respectively (Fig. 6), on the entrance side of the gauge which facilitate the entry of the stem of the pear into the slot 121 as the cup is swung upwardly to the stem end cut off station. At the exit end of the gauge, the lower member 120 is cut off and the upper member 119 is provided with a beveled edge 119d.

Referring to Fig. 9, it will be seen that, when a pear (shown in phantom lines) is disposed in the stem end cut off position adjacent the centering gauge 117, it is also in alignment with a pusher plate 150 which is mounted on the end of a rod 151 slidably journaled in a support tube 152. While a pear is held in this aligned position, the pusher plate is moved into contact with the butt end of the pear to firmly urge it into the spring-loaded centering chamber of the feed cup assembly to center the pear therein and positively press the stem end of the pear against the stationary gauge 117. It will be evident, therefore, that the pusher plate 150 must be reciprocated toward and away from the cup assembly immediately after a cup assembly arrives at the stem end cut off station Y. To effect the reciprocation of the pusher plate, one end of the pusher plate rod 151 is pivotally connected to an arm 153 that is keyed on a shaft 154 rotatably journaled in a cylindrical bearing member 155. The bearing member 155 and the tubular member 152, which supports the push rod 151, are both integrally formed on a bracket 160 which is secured to the side wall of a movable carriage that is in the form of a cylindrical cam 161. A tension spring 163 is connected between the arm 153 and a rod 164, adjustably mounted on the bracket 160, and is arranged to pivot the arm 153 and the shaft 154 in a clockwise direction. A second arm 166 is keyed to the shaft 154 and is arrranged to abut a stop member 167 which is adjustably mounted on a bracket 170 secured to the end standard 52. Reciprocation of the bracket 160 is obtained by reciprocating the cylindrical cam 161 on which the bracket is mounted. The cylindrical cam is slidably supported on a sleeve 174 which is rotatably mounted on the turret shaft 56. A camming slot 175 in the cam 161 receives a roller 177 which is mounted on the outer end of a rod 178 projecting radially from the sleeve 174. A gear 180 (Fig. 8) is keyed to the sleeve 174 and disposed in mesh with a gear 181 keyed to the continuously rotating shaft 63. The camming slot 175 has a straight portion disposed at right angles to the axis of the cylindrical cam. When the continuously moving roller 177 traverses this straight portion of the slot, there will be no axial movement of the cylindrical cam. Between the ends of the straight portion, the camming slot has a portion inclined in one axial direction to cause movement of the cylindrical cam in one direction longitudinally of the machine and another portion inclined in the opposite axial direction to cause movement of the cylindrical cam in the opposite direction. It will be evident that the gear drive of the sleeve shaft 174 can be so chosen that the cylindrical cam 161 is reciprocated immediately after a cup assembly is indexed to the cut off station Y.

The pusher plate 150 operates in the following manner. When the cylindrical cam 161 starts to move toward the right in Fig. 9, the arm 166 moves away from the stop 167 and the tension spring 163 is permitted to pivot the arm 153 to slide the pusher rod 151 toward the pear. As the cylindrical cam continues its movement toward the right, the pusher plate is brought into contact with the butt end of the pear. In this manner the spring loaded pusher plate 150 urges the pear into centered position in the cup assembly and into positive engagement with the gauge plate 117. After the pear is seated, the pusher plate is retracted to its dwell position shown in Fig. 9.

As seen in Fig. 9 the bobbing knife 33 has a hub 201 secured on a shaft 204 that extends longitudinally of the machine and is rotatably supported in spaced bearings 206 and 207 which are mounted in fixed position on end standards 51 and 52. Adjacent the bearing 206, a crank arm 208 (Fig. 5) is keyed to the shaft 204 and has a free end pivotally connected to a link 209 that extends transversely of the machine. The opposite end of link 209 is pivotally connected to a lever 210 (Fig. 8) which in turn is keyed to a shaft 211 journaled in the gear housing. A cam follower lever 214 is keyed to the shaft 211, said lever having a roller 215 arranged to ride in a cam groove 216 formed in the face of the gear 181 which continuously rotates with the shaft 63. The cam groove 216 has a camming surface designed to actuate the lever 214 and rotate the shaft 211 in a direction to pull the link 209 toward the left as seen in Fig. 5. This movement of the link 209 causes clockwise rotation of the longitudinal shaft 204 and downward movement of the bobbing knife 33 to cut the stem end from the pear that is held against the centering gauge 117. Since the distance, measured longitudinally of the machine, from the knife 33 to the face of the gauge plate 117 remains fixed, each pear will have the same amount cut off its stem end, leaving the main part of the pear in the feed cup assembly. If the severed stem end of the pear should remain in the gauge plate, the stem end of the next pear moved to stem end cut off position will force the several remnant out of the gauge plate.

Shortly after the stem end of the pear is cut off, the sleeve shaft 90 is angularly indexed to move the cup assembly from cut-off position Y to pear transfer position Z (Fig. 4) at which position the stem-blossom axis of the pear is aligned with the stemming tube 34 which has been indexed by turret 36 to position A (Fig. 3). While the pear (shown in phantom lines Fig. 9) is held in this position a second pusher 225, which is adjustably mounted on the bracket 160 of the reciprocable cylindrical cam 161, is carried forwardly to engage the butt end of the pear and force it through the cup assembly onto the stemming tube 34 against the resistance of resiliency closed upper and lower jaws. The end portion 226 of the pusher 225 is of a size to pass freely through the opening in the lower end of the cup, even when the cup is in closed position. Accordingly, in the push-off stroke the end portion 226 moves entirely through the cup assembly and assures the complete impaling of the pear on the stemming tube. After the pear has been removed from the cup, the cup will be returned to the pear feed station X by the next angular indexing of the sleeve shaft 90.

In this machine each pear is peeled by rotating the pear about its stem-blossom axis while the rapidly rotating cutter 40 moves longitudinally along the surface of the pear from the butt end to the stem end. In order to obtain a smooth and uniform peeled surface it is necessary that the stemming tube be continuously rotated and that the cutter be moved along the surface with a continuous motion. However, the only drive shaft available to drive these members is the turret shaft 56 which must be intermittently indexed to permit the transfer of the pears from the feed cups to the stemming tubes. Accordingly, a feature of the present invention is the provision of an auxiliary drive mechanism through which continuous rotation of the stemming tubes and continuous movement of the cutter along the pear may be obtained from the intermittent turret drive mechanism.

Referring to Fig. 8 it will be recalled that the main turret shaft 56 is intermittently indexed and the drive shaft 63 is continuously rotated. An auxiliary drive shaft 240 is continuously driven from shaft 63 through gears 241 and 242. Thus in this machine there are two longitudinal shafts, the intermittently rotated turret shaft 56 and the continuously rotated shaft 240. In the diagrammatic view of Fig. 11, it will be noted that the continuously rotating shaft 240 is arranged to drive an external-internal gear ring 245 through a gear 246 on shaft 240 and an idler gear 247 which meshes with the external teeth of the gear ring 245. Accordingly, ring gear 245 is continuously driven in a clockwise direction (Fig. 11). In Fig. 10 it will be seen that the ring gear 245 has a hub portion 245a rotatably journaled on a tubular shaft 250 which is journaled at one end in a bearing 251 in a housing 252 and which, at the other end, is provided with a flange 250a which is secured by capscrews 253 to a flange 254 that is welded at 255 to the turret shaft 56. Thus, the tubular shaft 250 forms an extension of turret shaft 56 and is intermittently driven thereby.

A sun gear 260 (Fig. 11) is secured by a key 261 to shaft 250 for intermittent movement therewith in a counterclockwise direction. A planet gear 262, which is in mesh with the sun gear 260 and with the internal gear teeth of ring gear 245, is journaled for rotation on a shaft 263 that is rotatably mounted in a planet carrier 265. The carrier 265 has a hub portion 265a (Fig. 10) journaled for free rotation on shaft 250 and a yoke-type end 265b which receives the shaft 263. Also journaled for rotation on the planet shaft 263 is a second planet gear 268 (Fig. 11) which is in mesh with a gear segment 270 that is secured to the stationary housing 252. The second planet gear 268 also meshes with a sun gear segment 274 that forms part of a three-piece oscillating unit 275. This unit comprises the gear segment 274 (Fig. 10), a composite gear ring 276 to which the segment 274 is secured by capscrews 277, and a cylindrical cam 278 to which the gear ring 276 is secured by capscrews 280. The gear ring 276 is made up of an annular support plate 276a and a gear segment 276b secured to the plate by capscrews 281. The cam 278 is journaled for rotation on shaft 250, while the segment 274 and the ring gear 276 are spaced therefrom, and thus the three-piece unit 275 is freely rotatable relative to shaft 250.

When an indexing movement of the turret begins, the sun gear 260 (Fig. 11) is rotated 60° counterclockwise with shaft 250 causing planet gear 262 and the planet shaft 263 to swing approximately 20° in a counterclockwise direction from their initial position which will be indicated by a vertical reference line P. Movement of planet shaft 263 through 20° of swinging movement causes the second planet gear 268 to drive the sun gear segment 274 through approximately 40° of swinging movement on shaft 250 relative to reference line P'. Accordingly, each time the turret shaft extension 250 is indexed 60°, the three-piece oscillating unit 275 is swung counterclockwise through approximately 40°. Then, when the turret shaft and the sun gear 260 are stationary during the interval between indexing movements, the continuously rotating ring gear 245 rolls planet gear 262 in a clockwise direction back to the vertical reference line P, causing the second planet gear 268 to swing the oscillating unit 275 clockwise back to its initial position. It will be noted that the oscillating drive unit 275 is continuously in motion and therefore there is continuous relative movement between the turret and the drive unit 275 both during indexing of the turret and between indexing movements of the turret. Further it will be understood that the gears in the various gear trains and the speed of rotation of the various movable members are so chosen that the continuous relative movement between the turret and the oscillating drive unit is carried on at a uniform rate.

As shown in Figs. 10, 11, and 12, each stemming tube 34 comprises a tubular member 300 rotatably journaled in two spaced rings 302 and 303 which are rigidly interconnected by a plurality of tie rods 304 (Fig. 13) to form the stemming tube turret 36. The ring 302 of the turret is secured to the radial flange 254 of the main turret shaft 56 by a plurality of capscrews 310. Thus, the stemming tube turret 36 is secured to the turret shaft 56 for indexing movement therewith. The tubular member 300 of each stemming tube has a fin assembly 312 (Fig. 12) set-screwed to its forward end and has a gear 313 locked on its rear end by a wedge block 315 which bears against a slotted hub 313a of the gear 313 to press the hub against the internal surface of the tubular member 300. A setscrew 317 is threaded through the tubular member 300 and has a nose portion disposed in an annular slot in the hub 313a to prevent axial movement of the gear. A snap ring 318 is engaged in a slot in the setscrew 317 to prevent rotation thereof.

Referring again to Fig. 11, it will be noted that the gear 313 of the stemming tube 34 is in mesh with a large gear 319 which is keyed on a shaft 320 that is journaled for rotation in the turret rings 302 and 303. A smaller gear 321, that is also keyed to shaft 320, is in mesh with gear teeth 325 on the outer periphery of the segmental ring gear 276 of the oscillating unit 275. As previously mentioned, when a 60° counterclockwise indexing movement of the turret is made, the unit 275 only swings 40° counterclockwise. This relative movement between the turret and the ring gear 276 causes the stemming tube to be rotated in a clockwise direction. When the indexing movement is stopped, the 40° reverse movement of the ring gear 276 in a clockwise direction will continue the clockwise rotation of the stemming tube. Thus, the indexing movement of the stemming tube turret and the oscillating movement of the unit 275 are utilized to obtain continuous rotation of the stemming tube during indexing of the machine.

As seen in Fig. 11, each stemming tube 34 progresses in a counterclockwise direction in 60° increments of movement. The stemming tubes 34A through 34F are illustrated in Fig. 11 at stations A through F, respectively, while they are at rest just before an indexing movement of the turret. In the at-rest position of Fig. 11, one end 326 of the segmental gear 276b is disposed at a position approximately 107°41′ counterclockwise from station F and the other end 327 is disposed at approximately 22°23′ clockwise from station F. An arcuate locking ring 328 (Figures 10 and 15) is secured, by capscrews 329 to the support ring 276a of the composite gear 276. This locking ring is coextensive with the opening defined between the ends 326 and 327 of gear segment 276b. A turning roller 340 (Figures 14 and 16) is mounted for rotation on a bracket 341 of the locking ring 328 and projects rearwardly therefrom adjacent the end 327 of the gear segment. Accordingly, as a stemming tube 34 approaches station F (Fig. 14), the small gear 321 (Fig. 16) leaves gear segment 276b, and the turning roller 340 enters a camming slot 345 in a block 346 secured to the face of the large gear 319. The camming slot 345 is so designed that, the large gear is rotated counterclockwise and a plate 347 secured to the block 346 comes into flat engagement with a cylindrical surface 348 formed on the locking ring 328. The engagement of the plate 347 with the surface 348 is shown at the left of Fig. 15. This engagement prevents rotation of the stemming tube while the stemming tube is at the pear removal station F and at the transfer station A where the next pear to be peeled is positioned on the stemming tube. A similar turning roller (not shown) is rotatably mounted on the locking ring 328 adjacent the gear segment end 326 so that the large gear will again be rotated to properly re-engage the small gear 321 with the gear segment 276a.

When a pear is transferred to a stemming tube, the stem end of the pear engages a nose stop plate 360 (Fig. 14) which is fixed on the end of a rod 361. The rod 361 is slidably disposed in a tube 362 which is mounted in stationary position between the rings 302 and 303 of the stemming tube turret. The rod 361 is automatically locked in its innermost position by means of a bracket 365 which has a central tubular portion 365a slidably disposed on the stationary tube 362, an outer tubular portion 365b slidably disposed on the tubular member 300 of the adjacent stemming tube unit, and an outer forked end 365c disposed around an adjacent tie rod 304 of the turret. A screw 368 extends through a hole in the central portion 365a and through a longitudinal slot 369 in the tube 362, and has an end portion threaded into the rod 361. With this arrangement the locking bracket 365 is movable with the rod 361 longitudinally of stationary tube 362.

The locking bracket 365 has an internally threaded opening 370 (Fig. 14) adapted to receive the threaded portion of a stud 371 which is secured in and projects outwardly from one side face of a lever 372 (Fig. 15). The lever 372 has a hub 373 rotatably disposed on the stationary tube 362 and an end portion on which a roller 375 is rotatably mounted. As seen in Fig. 15, the stud 371 is disposed intermediate the ends of lever 372, and the lever 372 is normally urged in a clockwise direction by a spring 376 disposed between an ear 377 on the lever 372 and a semi-cylindrical member 379 that has a pin 380 projecting through the spring and through an opening 381 in the ear 377. In Fig. 15 the stud 371 is illustrated as disposed centrally in the opening 370 of bracket 365. Accordingly, the nose stop is unlocked. Pivoting of the lever 372 to move the stud to this centrally disposed unlocked position is accomplished as the roller 375 rides along a camming surface 385 of a cam 386 that is secured by capscrews 387 to a flange 390 (Fig. 10) of the mounting ring 276a of composite gear 276. The camming surface 385 has a 25° rise portion 385a (Fig. 15) extending from a point R, located approximately 51°58′ before station F, a 45° dwell portion 385b, and a 36° fall portion 385c.

Since the cam 386 is secured to the composite gear 276, it oscillates therewith. Accordingly, when stemming tube 34E (Fig. 15) is indexed 60° counterclockwise to station F, the cam 386 is indexed 40° counterclockwise. Then, while the stemming tube is stationary at station F, the cam 386 is returned clockwise, causing the roller 375 to ride up the rise portion 385a to pivot lever 372 upwardly and raise the stud 371 to the central unlocked position in the opening 370. The pear is then withdrawn from the stemming tube by a mechanism to be described presently. As the stemming tube is indexed to the transfer station A, a roller 400 (Fig. 14), which is rotatably mounted on a slidable bracket 402, engages the slanted camming surface 403a of a cam plate 403 that is secured in fixed position on the housing 252 (Fig. 15) by capscrews 404. The bracket 402 (Figs. 14 and 15) has a central portion 402a slidable on the shaft 320, a forked end 402b slidable on one of the tie rods 304, and a tubular end 402c disposed around the tubular member 300 of the adjacent stemming tube assembly. As the roller 400 rides along the camming surface 403a, the end 402c engages a transverse pin 410 (Fig. 12) that projects through aligned slots 411 (only one being shown in Fig. 12) in the tubular member 300, and through a transverse opening 412 in a cylindrical member 413 that is slidably disposed in the member 300. The slide member 413 carries a forwardly projecting rod 415 that has a pointed end 415a and is guided in a bore 416 in the fin unit 312 of the stemming tube assembly. Thus, as the pin 410 is forced forwardly by cam roller 400, the rod 415 is moved toward the forward end of the stemming tube to contact and eject any stem material that may have become lodged therein. At the end of this stem ejecting stroke, the pointed end 415a of the rod is disposed outwardly of the end of the fin unit. It will be noted in Fig. 12 that, as the rod 415 is moved outwardly, the pin 410 will engage the tube portion 365b of the bracket 365 that is secured to the nose stop plate support rod 361. Accordingly, the nose stop plate 360 will be moved axially of the rod 361 to its initial pear-intercepting position. Then, when a new pear to be peeled is transferred to the stemming tube at station A, the pear comes into contact first with the pointed end 415a. Thereafter, as the pear is moved onto the stemming tube, the pointed end prevents sidewise movement of the pear by guiding it into the tube.

Referring to Figures 17 and 18, it will be noted that each peeling unit 41 is supported from the flange 254 of the turret shaft 56 by means of a mounting plate 440 which is secured by capscrews 441 to the flange 254. The mounting plate 440 has a cylindrical portion 440a (Fig. 19) disposed in a cylindrical opening 444 in the turret flange 254. Two bosses 450 and 451, which are integrally formed on the mounting plate 440, are arranged to slidably journal a tubular guide shaft 453 and to fixedly retain a tubular guide member 455. Both the slidable guide shaft 453 and a support rod 456 (Fig. 20) that is slidable in guide member 455, are secured to a split cutter support bracket 460 by a capscrew 461. As seen in Fig. 17, the support rod 456 has a cam follower roller 470 secured to one end, said follower roller being rotatable on a pin 471 which projects through an elongated slot 472 in the guide member 455. Similarly, a push rod 474, that is slidable in the slidable guide shaft 453, carries a rotatable cam follower roller 475 at its end.

The cutter support bracket 460 has an outwardly projecting arm 480 (Fig. 20) on the outer end of which a carrier bracket 482 is pivotally mounted on a bolt 483. As seen in Fig. 19, the bracket 482 has two spaced arms 482a and 482b, and each of these arms carries a pin 484 which pivotally supports an arm 485a or 485b of a yoke-like cutter support member 485. The cutter support member 485 has an elongated generally tubular portion 485c in which a shaft 492 is journaled for rotation in bearings (not shown). The cutter 40 is locked on the shaft 492 for rotation therewith between a spacer tube 501 and a nut 502 disposed on the threaded end of the shaft. A pulley 504 is secured on the other end of the shaft 492 between a hub 505 of the support member 485 and a nut 506.

It will be apparent that, when the support rod 456 is slid back and forth in the mounting plate 440 (Fig. 17), the cutter unit will be carried toward and away from the mounting plate 440. During this reciprocating movement, the flat surface of a ledge 510 (Fig. 18) on the bracket 482 slides along the upper surface 512a (Fig. 17) of a support arm 512 that is secured by capscrews 513 to the mounting plate 440. When the bracket 482 approaches the outer end of the support arm 512, a pin 515 (Fig. 20) in the support arm enters a slot 516 in the bracket 482, causing the bracket to pivot about bolt 483. This movement of the cutter around the outer end of the support arm 512 takes place just after the cutter assembly leaves the pear transfer station A where a pear is positioned on the associated stemming tube. The unit is so designed that the pivotal movement of the unit around the end of support arm 512 places the cutter 40 into peeling contact with the butt end of the pear. When the cutter is so positioned, the unit is moved back toward the mounting plate 440 and the engagement of the pin 515 in slot 516 pivots the unit in a reverse direction, causing the cutter 40 to move along the butt end of the pear. When the pin moves out of engagement with the slot 516, the ledge 510 moves into contact with the upper surface of the support arm 512.

Each cutter 40 is rotated by means of a belt 517 (Fig. 18) that is disposed around the cutter pulley 504 and around a pulley 518. The pulley 518 is keyed to a shaft 519 (Fig. 10) that is rotatably mounted in a boss 520 formed on the turret shaft flange 254. A gear 522 (Fig. 13) which is secured to the shaft 519, is in mesh with a gear 523 that is secured to a flange 524 of a shaft 525 rotatably mounted at one end in a bearing 526 (Fig. 10) disposed in a recess in the shaft 56 and at the other end in a bearing 527 disposed in the shaft 250. A pulley 530, which is keyed to the end of shaft 525, is driven by a belt 531 from a motor 532 (Fig. 25) mounted on the housing 252.

During the movement of the cutter 40 along the surface of the pear, the cutter is urged into contact with the pear by two springs 534 and 535 (Fig. 19), each of which is anchored at one end in a plate 537 secured to the bracket 482 and at the other end in the arm 485a of the yoke-like cutter support member 485. The spring 535 has one end 535a hooked in a threaded pin 538 and the other end hooked around a post 539 fixed in the arm 485a. A bar 540 is disposed inside spring 535. When the cutter 40 is swung upwardly away from the associated stemming tube, as indicated by arrow 542 in Fig. 18, the spring 534 is tensioned and the post 539 (Fig. 19) is moved in the direction of arrow 543, causing a lock nut 544 on the threaded pin 538 to move against the anchoring plate 537. Further movement of the post 539 causes the spring 535 to be tensioned and the distance between the post 539 and the threaded pin 538 to be increased to a distance greater than the length of bar 540. During movement of the cutter 40 along the pear, both springs 534 and 535 urge the cutter inwardly toward the associated stemming tube to maintain peeling contact of the cutter with the pear. Accordingly, as the cutter 40 moves toward the stem end of the pear, the springs gradually contract. Just before the stem end of the pear is reached, the pin 539 contacts the bar 540 and moves it against the pin 538. Further contraction of the spring 535 is prevented and, during the remainder of the movement of the cutter over the pear, the cutter is urged inwardly only by the relatively light spring 534. Only a light spring pressure is applied during peeling of the stem end of the pear, and accordingly, the stem end of the pear is not crushed or broken away during peeling.

In Fig. 10 it will be noted that the inner end of the support rod 455 of each cutter actuating mechanism is supported in a recess 550 in a ring 551 that is disposed in supported relation on one end of the cylindrical cam 278 of the oscillating unit 275. Also, the follower roller 470 on the cutter mounting rod 456 is disposed in a camming groove 555 of cylindrical cam 278. Referring to Fig. 11, it will be recalled that each time the turret, which carries the cutter unit, is indexed counterclockwise 60°, the oscillating unit 275, which includes the cylindrical cam 278, is moved counterclockwise 40°. The relative angular movement causes the roller follower 470 to advance 20° around the axis of the cylindrical cam 278 during each indexing movement. Then, while the turret is stationary between indexing movements, the oscillating unit 275 is swung back clockwise 40°, causing the follower 470 to move 40° more around the cylindrical cam 278. It will therefore take six indexing cycles to move the cutter around the cam 278 and, in this time, the cutter mounting rod with the cutter unit thereon makes a complete reciprocation whereby the cutter is moved lengthwise of the stemming tube from a position near the stem end of a pear already peeled at station F to a point past the butt end, and then the cutter is returned along the surface of a new pear to be peeled until the cutter again arrives adjacent the stem end of the pear at station F.

When the cutter reaches the stem end of a peeled pear at station F, it is moved outwardly away from the pear by a lifter arm 560 (Fig. 20) that is pivotally mounted by a pin 561 on a boss 562 formed on the arm 480 of mounting bracket 60. The lifter arm 560 is pivotally connected at 565 to a curved link 566 that is secured to the push rod 474. When the link 566 is moved to the phantom line position of Fig. 20, the lifter arm 560 is pivoted counterclockwise causing a curved surface 568 of the lifter arm to engage the cutter support tube 485c to raise the cutter away from the peeled pear. The pivot bolt 483 engages a curved wall of a recess 570 in the lifter arm 560 to limit clockwise movement of the lifter arm.

The push rod 474 is reciprocated as a result of the engagement of its cam follower roller 475 with a camming surface 590 (Fig. 10) of the cam 386 which is part of the oscillating unit 275. The camming surface 590 is slanted in the direction indicated in Fig. 14 from a point M (Fig. 15) which is 10°38′ before station F to a point approximately 108°37′ past station F, and thereafter has a slight reverse slanted portion extending for approximately 11°45′. The cam follower roller 475 is progressed along the camming surface 590 of the oscillating unit 275 in the same manner as the roller 470 was moved around cylindrical cam 278, that is, relative movement between the turret and the oscillating unit causes the roller 475 to move approximately 20° around the cam, and then reverse movement of the oscillating unit while the turret is stationary causes the remaining 60° of relative movement. The first portion of the travel of the roller 475 on camming surface 590 causes the lifter arm to raise the cutter away from the peeled pear. Thereafter the camming surface maintains the lifter arm in the cutter raising position as the cutter is moved toward the blossom end of the pear. As the cutter travels inwardly around the blossom end of the pear toward the stem-blossom axis of the pear, the cutter support tube 485c rides along the raised lifter arm 560 toward the outer end of the arm. Approximately at the time the pear reaches station B, the roller 475 rides onto the reversely inclined portion of the camming surface causing the lifter arm to be pivoted in a clockwise direction and permitting the cutter to move inwardly toward the pear. When the roller leaves the camming surface, the cutter is held in engagement with the pear surface by the springs 534 and 535.

Figures 21, 22, 23 and 24 illustrate successive operating positions of a cutter unit 41 as it is moved through a cycle of operation. In Fig. 21 the cutter unit 41 is at station F and the camming surface 590 has moved one end of the push rod 474 away from the stemming tube turret 36, causing the lifter arm 560 to pivot and raise the cutter 40 away from the peeled pear. As the cutter is indexed away from station F, the camming surface 590 maintains the lifter arm in raised position while cam track 555 (Fig. 22) of cylindrical cam 278 moves the cutter support arm 456 relative to turret 36 to bring the cutter to the butt end of the next pear to be peeled. Near the end of this movement of support arm 456, the pin 515 enters slot 516 to cause the unit to be pivoted down to position the cutter 40 at the butt end of the pear (Fig. 23). The camming surface 590 and the cam track 555 then move the unit back toward the turret, causing the cutter 40 to be swung back up around the butt of the pear and then along the length of the pear as it peels the rotating pear to a position at the stem end of the peeled pear (Fig. 24), ready for the lifter arm 590 to be actuated to raise the cutter away from the pear.

It will be noted in Fig. 14 that the stemming tube does not project entirely through the pear. Accordingly, a small portion of the stem material at the butt end of the pear, which is still attached to the stem material inside the tube, must be pushed into the tube. This is effected by an elongated cutter unit 600 (Fig. 25) which is mounted on the reciprocating cylindrical cam 161 in alignment with station C. The cutter unit 600 comprises a rod 601 (Fig. 26) having a recess 602 in which a cutter head 603 is secured, as by soldering. The head has two oppositely facing sharpened knives 604 and 605. When the cam 161 moves toward the left (Fig. 25) the knives move into the butt end of the rapidly rotating pear and cut the stem material at that end free. When the pear is indexed to station D, a pusher 610 moves into contact with the severed stem material and pushes it into the stem tube, thus completely freeing the stem material from the main part of the pear.

When a peeled pear reaches station F, it is removed from the stemming tube by a pear removing mechanism 615 which may be of the type described in Patent No. 2,139,704 to A. R. Thompson et al. In general this mechanism comprises a pair of laterally spaced upper arms 616 and a pair of lower arms 617 (one arm of each pair being shown). The arms are carried in a cylindrical clamp housing 618 which is secured to the top of the cam cylinder 161 for reciprocation therewith. The arms have pear-gripping pads 620 on their forward ends. The arrangement is such that the arms are moved to a position with the pads 620 on opposite sides of a peeled pear. The arms are then cammed inwardly so that the pads frictionally grip the pear. While the pear is so gripped the arms are moved rearwardly, withdrawing the pear from the stemming tube and positioning it on a blade of a splitting, coring and trimming unit 625. The construction and operation of this unit is completely described in the above mentioned Patent No. 2,139,704 to Thompson et al. After the peeled pear has been split, cored, and trimmed, the arms are moved to an open position, dropping the pear halves in a discharge chute 630 which is supported from the base 50 by a bracket 631.

From the foregoing description it will be apparent that the present invention provides a novel, efficient fruit preparation machine. The novel drive mechanism wherein the stemming tube is rotated continuously and the rotary cutter is moved continuously along the fruit surface makes possible for the first time the efficient use of a rotary cutter in conjunction with an intermittently operated turret. The novel stem end gauge plate, the nose stop lock mechanism, the pointed rod that slides into the stemming tube as it guides the fruit onto the tube, and the novel butt end trim knife, all cooperate to carry out the processing of fruit in a more efficient manner than has heretofore been possible.

Having thus described our invention, what we claim as new and desire to protect by Letters Patent is:

1. In a fruit preparation machine, a rotatable turret, a rotary cutter mounted on said turret for rotation about its own axis and for movement longitudinally of the axis of said turret, means for moving said cutter longitudinally of said turret, an elongated pulley journaled for rotation in said turret, a drive belt connecting said pulley with said cutter, and means for simultaneously rotating said pulley and moving said cutter longitudinally of said turret, said belt being movable longitudinally of said pulley during longitudinal movement of said cutter.

2. In a fruit preparation machine, a turret, a shaft journaled for rotation in said turret, a plurality of rotary cutters mounted on said turret in circular formation around the axis of said shaft, a rotary drive member in driving relation with each cutter, a belt and pulley drive mechanism connected to each drive member, a driven gear connected in driving relation with said belt and pulley mechanism, a drive gear keyed to said shaft and in mesh with all of said driven gears, and means for rotating said shaft.

3. In a fruit preparation machine, a rotatable turret, a stemming tube mounted on said turret for rotation about its own axis, means for intermittently indexing said turret through predetermined increments of angular movement, a continuously rotating drive shaft, and means including said turret indexing means and said continuously rotating drive shaft for continuously rotating said stemming tube as said turret is indexed through a predetermined number of said angular increments.

4. In a fruit preparation machine, a rotatable turret, a stemming tube mounted on said turret for rotation about its own axis, means for intermittently indexing said turret through predetermined increments of angular movement, a peeling cutter mounted for movement longitudinally of said stemming tube to peel a fruit impaled thereon, and means for moving said cutter longitudinally with a continuous smooth movement while said turret is indexed through a predetermined number of said angular increments.

5. In a fruit preparation machine, a rotatable turret, a stemming tube mounted for rotation on said turret, a peeling cutter mounted adjacent said stemming tube on said turret for movement with said turret and for movement longitudinally along said stemming tube, means for intermittently indexing said rotatable turret, and means for continuously rotating said stemming tube and moving said peeling cutter longitudinally along said stemming tube with a continuous motion while said turret is moved through a predetermined number of indexing movements.

6. In a fruit preparation machine, a turret, a stemming tube mounted on said turret for rotation about its own axis, a driven gear keyed to said tube, a drive gear operatively associated with said driven gear, means for rotating said turret and said drive gear about the same axis but through different angular distances in the same angular direction to effect rotation of said stemming tube, and means for rotating said drive gear in an opposite direction while holding said turret in fixed position whereby to continue the rotation of said stemming tube.

7. In a fruit preparation machine, a turret, a stemming tube mounted in said turret for rotation about its own axis, a driven gear keyed to said tube, a drive gear operatively associated with said driven gear, an oscillatable gear secured to said drive gear and arranged to oscillate about the axis of said turret, means providing a segment of a gear disposed in fixed position adjacent said oscillatable gear, a planet gear disposed in mesh with said oscillatable gear and said gear segment, drive means for rotating said turret through a first angular movement, and means for rotating said planet gear to effect swinging movement of said oscillatable gear through an angular movement around said axis less than the angular movement of said turret whereby the difference in the extent of said angular movements causes rotation of said stemming tube.

8. In a fruit preparation machine, a turret, a stemming tube mounted in said turret for rotation about its own axis, a driven gear keyed to said tube, a drive gear operatively associated with said driven gear, a first gear segment secured to said drive gear and arranged for rotation about the axis of said turret, a second gear segment mounted in fixed position and having gear teeth disposed in confronting relation to the teeth of said first gear segment, a sun gear mounted for rotation about the axis of said turret, a planet gear set mounted for movement about the axis of said sun gear and having one planet gear in mesh with said sun gear and a second planet gear in mesh with both of said gear segments, and means for rotating said turret and said sun gear through a predetermined angular movement causing said first gear segment and the attached drive gear to be moved through an angular distance less than the angular movement of said turret whereby to effect rotation of said stemming tube.

9. In a fruit preparation machine, a turret, a stemming tube mounted in said turret for rotation about its own axis, a first gear segment mounted for swinging movement about the axis of said turret, gear means interconnecting said tube and said first gear segment, a second gear segment mounted in fixed position and having gear teeth disposed in confronting relation to the teeth of said first gear segment, a sun gear mounted for rotation about the axis of said turret, a ring gear having internal teeth mounted for rotation about said axis, means for continuously rotating said ring gear in a direction opposite to the direction of rotation of said turret, a planet gear set mounted for movement about the axis of said sun gear and having one planet gear in mesh with said sun gear and with the internal teeth of said ring gear and a second planet gear in mesh with both of said gear segments, and means for rotating said turret and said sun gear through a predetermined angular movement causing said first gear segment to be moved through an angular distance less than the angular movement of said turret whereby to effect rotation of said stemming tube, said continuously rotating ring gear being arranged to swing said first gear segment in an opposite direction as soon as the angular movement of said turret is halted.

10. In a fruit preparation machine, a turret, a plurality of fruit carriers on said turret, a cutter carrier rod slidably mounted on said turret and disposed parallel to the axis of said turret, a cylindrical cam mounted for rotation about the axis of said turret, means defining a cam track in the surface of said cam, a cam follower carried by said rod and disposed in said cam track, drive means for intermittently rotating said turret and said cam through different angular distances around said axis to move said follower in said cam track part way around the periphery of said cylindrical cam, and means for rotating said cam in an opposite direction while said turret is stationary between intermittent movements thereof whereby to continue the movement of said cam follower around the periphery of said cam.

11. In a fruit preparation machine, a turret, a cutter carrier rod slidably mounted in said turret and disposed parallel to the axis of said turret, a cylindrical cam mounted for rotation about the axis of said turret, means defining a cam track in the surface of said cam, a cam follower carried by said rod and disposed in said cam track, an oscillatable gear secured to said cam and arranged to oscillate about the axis of said turret, a sun gear mounted for rotation about the axis of said turret, planetary gear means operatively connecting said sun gear and said oscillatable gear for swinging said oscillatable gear about said axis in response to rotation of said sun gear in one angular direction, means for intermittently rotating said sun gear and said turret through different angular amounts in said one angular direction to move said follower part way around the periphery of said cam, a ring gear mounted for rotation about said axis and having teeth in meshing relation with said planetary gear means, and means for continuously rotating said ring gear in an angular direction opposite to said one direction whereby, during dwell periods between intermittent rotary movements of said turret, said continuously rotating ring gear swings said oscillating gear in said opposite direction to continue the movement of said follower around the periphery of said cam, said cam track being arranged to cause sliding reciprocation of said carrier rod in said turret as said follower moves around the periphery of said cam.

12. In a fruit preparation machine, a turret, a fruit nose stop slidable in said turret, an oscillatable cam mounted for swinging movement about the axis of said turret and having a peripheral camming surface, a lever pivotally mounted on said turret, means carried by said lever and arranged upon pivoting of said lever in one direction to engage said stop and lock said stop against sliding movement in said turret, a cam follower carried by said lever and disposed in contact with said camming surface, and means for simultaneously moving said cam and said turret through different angular distances about the turret axis to cause said follower to progress along said camming surface to effect pivoting movement of said lever in said one direction.

13. In a fruit preparation machine, a cutter unit comprising an elongated support member, a carrier bracket mounted for sliding movement along said support member and pivoting movement relative to said support member about an axis transverse to said member, a cutter support lever pivotal on said carrier bracket, a cutter shaft journaled in said lever, a rotatable cutter drive member mounted in fixed position in spaced relation to said cutter shaft, a pulley keyed to said cutter shaft and having a substantially V-shaped groove therein, and a belt disposed in said groove and connecting said drive member in driving relation with said cutter shaft, said belt and pulley drive being arranged to automatically adjust the belt in said V-shaped groove to permit sliding movement of said carrier bracket along said support, pivoting of said bracket about said transverse axis, and pivoting of said cutter support lever on said bracket.

14. In a fruit preparation machine, a tubular fruit support member, a fruit guide member slidable in said tubular member between a position within said tubular member to a projected position outwardly thereof, means defining a pointed end on said guide member adapted, when said guide member is in said projected position, to pierce a fruit moved toward said tubular member and prevent lateral movement of the fruit as the movement of the fruit toward said tubular member is continued, and means for initially moving a fruit toward said tubular member and into guided engagement with said pointed end and then continuing the movement of the fruit to force said guide member into said tubular member and to move the fruit onto said tubular member.

15. In a fruit preparation machine, a stemming tube, a stop member adjacent said tube and arranged to be contacted by a fruit as the fruit is moved onto said tube, means mounting said stop member for movement longitudinally of said stemming tube under the urging of the fruit being moved longitudinally onto said tube, a bracket connected to said stop means for longitudinal movement therewith, and a cam actuated locking member arranged to be moved into engagement with said bracket to lock said bracket against said longitudinal movement.

16. In a fruit preparation machine, a support structure, a stemming tube on said support structure, a stop member adjacent said tube and arranged to be contacted by a fruit as the fruit is moved onto said tube, means mounting said stop member on said support structure for movement longitudinally of said stemming tube under the urging of the fruit being positioned on the tube, a bracket connected to said stop means for longitudinal movement therewith and having an internally threaded opening, a lever pivoted on said support structure and having an externally threaded member projecting into the opening of said bracket, and means for pivoting said lever between a position wherein the threads on said externally threaded member are spaced from the internal threads of said bracket and a position wherein said threads are in engagement and locking said stop member against movement along said tube.

17. In a fruit preparation machine, a turret, a stemming tube mounted on said turret, a guide tube mounted on said turret in parallel spaced relation to said stemming tube and having a longitudinally extending slot, a rod slidable in said guide tube, a nose stop secured to said rod, a bracket slidable on said guide tube and having an internally threaded opening, means extending through the slot in said tube and connecting said rod to said bracket for unitary sliding movement relative to said tube, a lever pivotally mounted on said turret, an externally threaded locking member carried by an arm of said lever and projecting through the internally threaded opening in said bracket, and cam means mounted on said turret and engageable with said lever to pivot said lever between a position wherein the threads of said locking member are centrally disposed in said opening and a position wherein the threads of said locking member are engaged with the internal threads of said bracket to lock said bracket and said rod against longitudinal movement in said guide tube.

18. In a fruit preparation machine, a stemming tube, means for impaling a pear on said tube with the stem blossom axis of the pear disposed on the axis of the tube and with the end of the stemming tube projecting into one end of the pear and extending to a point in the interior of the pear spaced from the opposite end of the pear, a cutter mounted adjacent to and in alignment with said stemming tube for axial movement toward said tube end to cut into said opposite end of said pear along the axis thereof to a point closely adjacent the end of said stemming tube, means for effecting relative rotary and axial movement between the pear and said cutter to make a cylindrical cut in the pear at said opposite end, and a pusher member mounted for movement into said cylindrical cut in the pear to push the severed stem material toward and into said stemming tube.

19. In a fruit preparation machine, a stemming tube, means for impaling a pear on said tube with the tube projecting into the stem end of the pear to a point spaced from the butt end of the pear, a cutter mounted adjacent to and in alignment with said stemming tube, means for reciprocating said cutter for moving said cutter toward said stemming tube and into the butt end of the pear to a point close to the end of the stemming tube and then withdrawing said cutter from the pear, and means for rotating the stemming tube while said cutter is disposed in the pear whereby a cylindrical cut is made in the stem material at the butt end of the pear, and a pusher member mounted for movement into the butt end of the pear to push the severed stem material toward and into said stemming tube.

20. In a fruit preparation machine, a gauge mechanism comprising a pair of spaced plates having forward fruit contacting surfaces and opposed edges defining a continuous side-opening slot, and a rigid connector member fixed to both plates and projecting rearwardly therefrom, said connector member being arranged to hold said plates in fixed position and being spaced at all points from the open end of said slot to permit the stem of a fruit to pass into said slot.

21. In a fruit preparation machine, a gauge mechanism comprising a pair of plates connected in fixed spaced relation to define a continuous slot and having fruit contacting surfaces in a common plane and having spaced opposed rounded edges defining a slot adapted to receive the stem of a fruit moved against the contact surfaces of said plates, said rounded edges being effective to shift the end of a fruit toward a centered position between said edges.

22. In a fruit preparation machine, a turret, means for intermittently indexing said turret through predetermined increments of rotation, a drive unit mounted for oscillation about the axis of said turret, and drive means operatively associated with said turret indexing means and with said drive unit for swinging said oscillating drive unit and said turret in a first angular direction with a predetermined relative angular velocity between said turret and said drive unit and then holding said turret stationary while swinging the oscillating drive unit in the opposite angular direction at an angular velocity such that the relative velocity between the stationary turret and the drive unit is the same as when said unit is moved in the first direction, whereby to continuously urge said drive unit in a predetermined angular direction at a uniform rate of speed relative to said turret during and between indexing movements of said turret.

23. In a fruit preparation machine, a turret, means for intermittently indexing said turret through predetermined increments of rotation, a drive unit mounted for oscillation about the axis of said turret, and means for effecting uniform relative movement between said turret and said unit during and between indexing movements of said turret, said means including a planetary gear system operatively connected between said drive unit and said turret indexing means.

24. In a fruit preparation machine, a stemming tube, a cutter support member mounted for movement along a fixed path adjacent to and longitudinally of said tube, a lever pivoted on said support member, a cutter rotatably mounted on said lever adjacent one end thereof and movable toward and away from said stemming tube during pivoting of said lever, a lifter arm pivotally mounted on said support member and disposed in engagement with said lever, and means for pivoting said lifter arm to move said lever and the cutter thereon toward and away from said stemming tube.

25. In a fruit preparation machine, a stemming tube, a cutter support member mounted for movement along a fixed path adjacent to and longitudinally of said tube, a lever pivoted on said support member, a cutter rotatably mounted on said lever and movable toward and away from said stemming tube during pivoting of said lever, a first tension spring connected between said lever and said support member and arranged to pivot said lever in a direction to move said cutter against the surface of a pear on said stemming tube, a pair of spaced abutment members, one abutment member being disposed on said lever and the other on said support member, a bar disposed between said abutment members, and a second spring disposed around said bar and anchored at opposite ends in said abutment members, said first and second springs being arranged to jointly pivot said lever in a direction to move said cutter against the surface of a pear and to cause said abutment members to engage opposite ends of said rod and prevent further contraction of said second spring, said first spring being arranged to continue the pivoting of said lever after said second spring is inactive.

26. In a fruit preparation machine, a cutter carrier bracket, a cutter support lever pivoted on said bracket, means for pivoting said lever through a predetermined angular range in a predetermined direction relative to said bracket including a strong spring and a relatively weak spring operatively connected between said lever and said bracket and arranged to urge said lever in said predetermined direction, and means for inactivating said strong spring during a portion of said angular range.

27. In a fruit preparation machine, a rotatable turret, a stemming tube mounted on said turret for rotation about its own axis, means for intermittently indexing said turret through predetermined increments of angular movement, and means for continuously rotating said stemming tube as said turret is indexed through a predetermined number of angular increments including a planetary gear system operatively connected between said turret indexing means and said stemming tube.

28. In a fruit preparation machine, a rotatable turret, a stemming tube mounted on said turret for rotation about its own axis, means for intermittently indexing said turret through predetermined increments of angular movement, a peeling cutter mounted for movement longitudinally of said stemming tube to peel a fruit impaled thereon, and means for moving said cutter longitudinally with a continuous smooth movement while said turret is indexed through a predetermined number of said angular increments, said means including a planetary gear system operatively connected between said turret indexing means and said cutter.

29. In a fruit preparation machine, a rotatable turret, a stemming tube mounted for rotation on said turret, a peeling cutter mounted adjacent said stemming tube on said turret for movement with said turret and for movement longitudinally along said stemming tube, means for intermittently indexing said rotatable turret, and means for continuously rotating said stemming tube and moving said peeling cutter longitudinally along said stemming tube with a continuous motion while said turret is moved through a predetermined number of indexing movements, said latter means including a planetary gear system operatively connected between said turret indexing means, said stemming tube, and said peeling cutter.

30. In a fruit preparation machine, a support member, a fruit nose stop slidable in said support member, an oscillatable cam mounted for swinging movement and having a peripheral camming surface, a lever pivotally mounted on said support member, means carried by said lever and arranged upon pivoting of said lever in one direction to engage said stop and lock said stop against sliding movement in said support member, a cam follower carried by said lever and disposed in contact with said camming surface, and means for oscillating said cam to effect pivoting movement of said lever in said one direction.

31. In a fruit preparation machine, a stemming tube, a stop member adjacent said tube and arranged to be contacted by a fruit as the fruit is moved onto said tube, means mounting said stop member for movement longitudinally of said stemming tube under the urging of the fruit being moved longitudinally onto said tube, and a cam actuated locking member arranged to be moved into engagement with said stop means to lock said stop means against said longitudinal movement relative to said stemming tube.

References Cited in the file of this patent
UNITED STATES PATENTS

| | | |
|---|---|---|
| 1,336,304 | Leumann | Apr. 6, 1920 |
| 1,950,718 | Duncan | Mar. 13, 1934 |
| 2,056,413 | Thompson et al. | Oct. 6, 1936 |
| 2,236,075 | Siemann | Mar. 25, 1941 |
| 2,447,640 | Dunn | Aug. 24, 1948 |
| 2,502,797 | Luhdorff et al. | Apr. 4, 1950 |
| 2,742,067 | Coons et al. | Apr. 17, 1956 |